Oct. 6, 1964  J. C. BROWN  3,151,655
ANTI-SKID TIRE CHAIN MOUNTING ARRANGEMENT
Filed March 3, 1964

INVENTOR
JOHN C. BROWN
BY Howson & Howson
ATTYS.

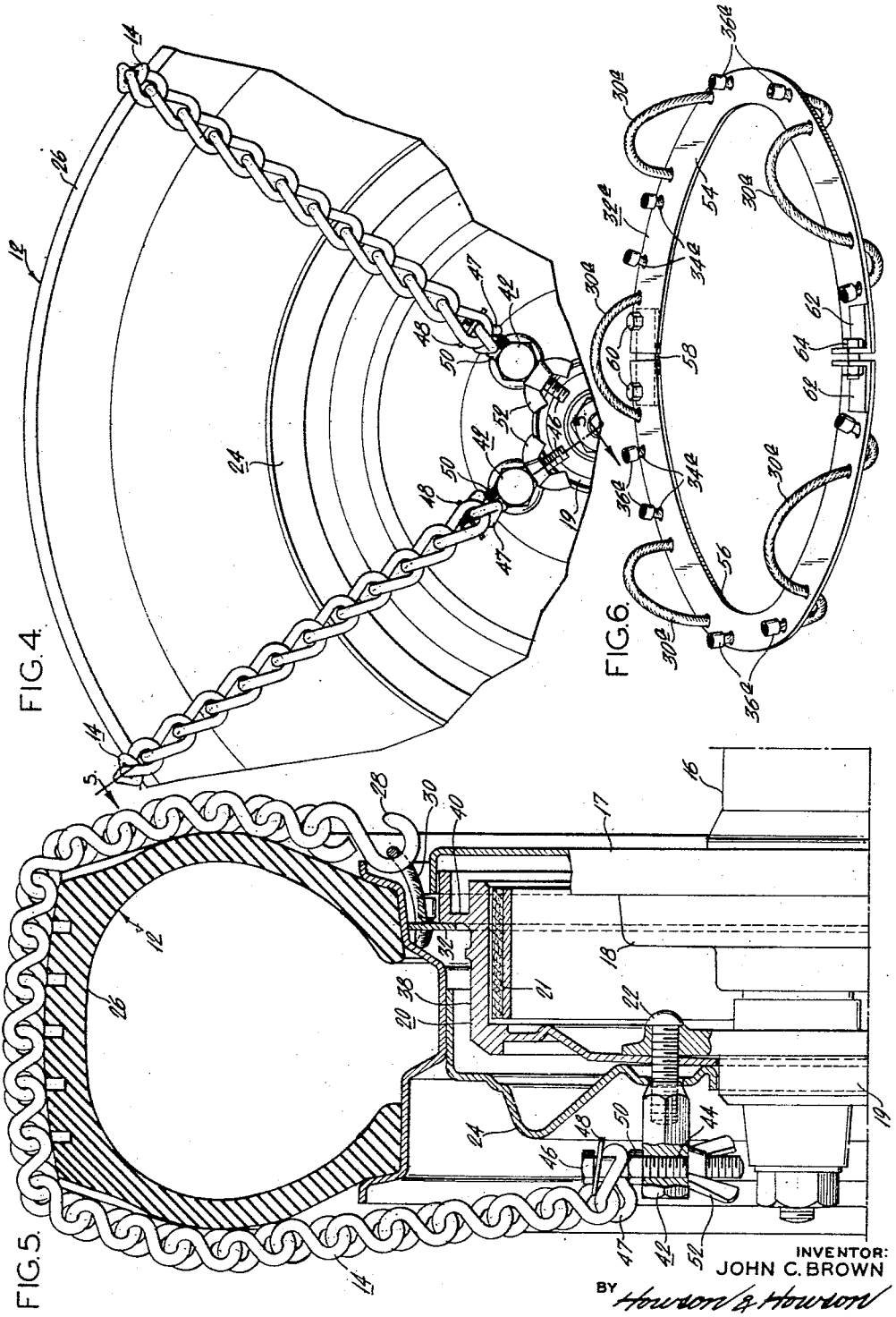

Oct. 6, 1964 J. C. BROWN 3,151,655
ANTI-SKID TIRE CHAIN MOUNTING ARRANGEMENT
Filed March 3, 1964 3 Sheets-Sheet 3
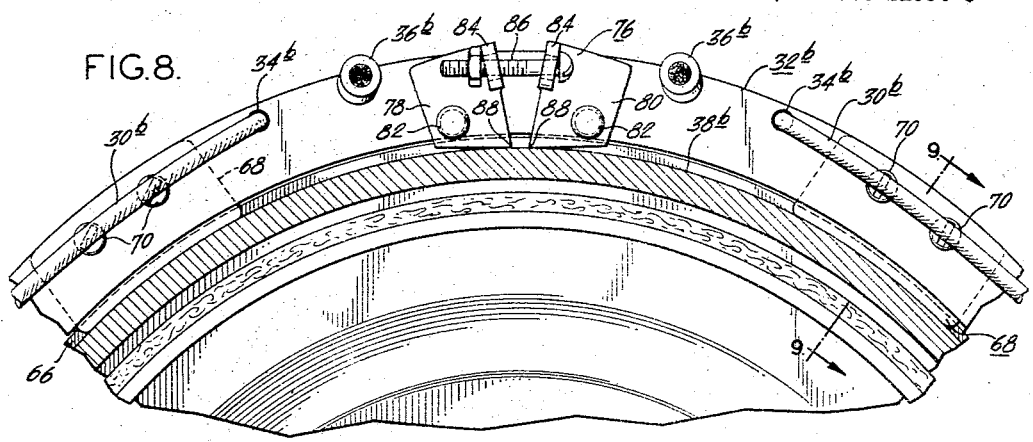
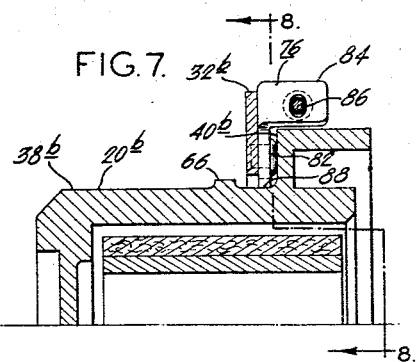
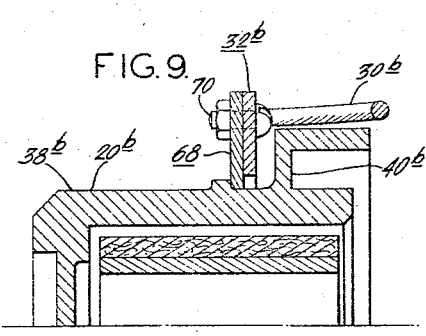
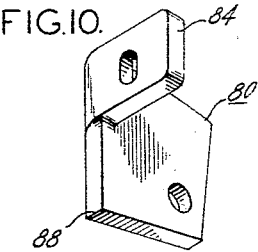
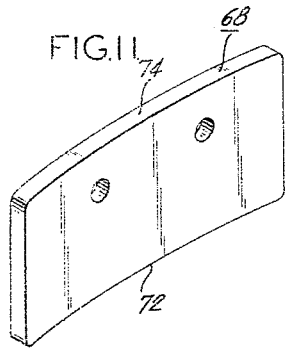
INVENTOR:
JOHN C. BROWN
BY Howson & Howson
ATTYS.

United States Patent Office 3,151,655
Patented Oct. 6, 1964

3,151,655
ANTI-SKID TIRE CHAIN MOUNTING
ARRANGEMENT
John C. Brown, 304 Maple Ave., Delanco, N.J.
Filed Mar. 3, 1964, Ser. No. 348,992
10 Claims. (Cl. 152—233)

The present invention relates generally to anti-skid tire chains for motor vehicles and more particularly to a mounting arrangement for securing individual cross-tread chain lengths to a vehicle wheel.

Conventional anti-skid chains are characterized by a series of spaced parallel cross-tread chain lengths attached to a pair of side chain elements, the respective ends of which are joined together to form an annular tire encircling assembly. Although such chains provide added traction upon snow or ice, their application or removal is a difficult and time-consuming task. In addition, the resilient tensioning devices employed with conventional chains fail to maintain the cross-tread chain lengths in firm engagement with the tire tread causing the familiar and destructive flapping and whipping of the chain lengths against the road surface and adjacent elements of the vehicle.

The unavailability of an effective and easily mounted anti-skid device creates a hazardous situation during snowy and icy road conditions because of the reluctance of drivers to engage in the unpleasant task of applying conventional chains or to incur the expense of service station installation. The result is that when road conditions are at their worst during a snow storm or freezing rain, a dangerously small percentage of vehicles are properly equipped with anti-skid devices. Conversely, the drawbacks of conventional chains discourage their removal when conditions are improved, causing needless rapid wear of chains and tires upon bare road surfaces.

In view of the above, it is a primary object of the present invention to provide a tire chain mounting arrangement which permits the rapid and convenient attachment and removal of individual cross-tread chain lengths to a vehicle wheel.

An additional object of the invention is to provide a tire chain mounting arrangement, as described, which includes a simple and effective tensioning arrangement for securing the chain lengths against the tire tread.

A further object of the invention to to provide a tire chain mounting arrangement, as described, the required fastening elements of which may be removably applied to and maintained on a vehicle without altering or interfering with the normal operation or appearance of the vehicle elements.

Additional objects and advantages of the invention will be more readily apparent from the following detailed description of embodiments thereof when taken together with the accompanying drawings in which:

FIG. 4 is a partial elevational view of the front face of a wheel assembly showing the manner in which the outer ends of the cross-tread chain lengths are secured;

FIG. 5 is a sectional view taken along line 5—5 of FIG. 4 showing the specific details of the attachment of the cross-tread chain lengths;

FIG. 6 is a perspective view showing a modified form of chain-securing ring;

FIG. 7 is a partial sectional view with parts removed for clarity showing a further modified chain-securing ring mounted on a brake drum;

FIG. 8 is a view taken along line 8—8 of FIG. 7;

FIG. 9 is a view taken along line 9—9 of FIG. 8;

FIG. 10 is a perspective view of one of the ring-securing elements of the embodiment of FIGS. 7–9; and FIG. 11 is a perspective view of an additional ring-securing element of the embodiment of FIGS. 7–9.

Figure 1:
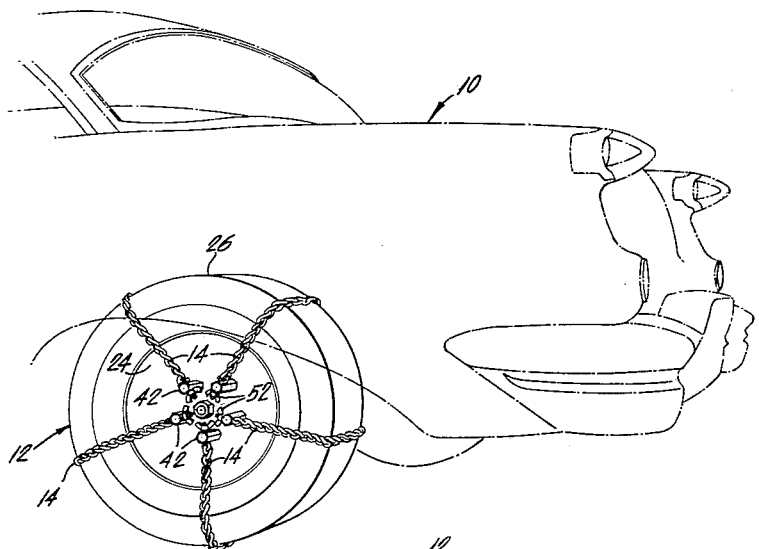
FIG. 1 is a perspective elevational view showing the rear portion of an automobile, a rear wheel of which includes cross-tread, anti-skid chain lengths mounted thereon in accordance with the present invention.

Referring to the drawings, FIG. 1 shows in broken lines the rear portion of an automobile 10, the rear wheel and tire assembly 12 of which is equipped with cross-tread chain lengths 14 which are secured thereto in the novel manner of the present invention. The chain lengths serve to prevent skidding and to provide added traction on slippery surfaces such as snow, ice and mud, as well as loose surfaces such as sand or gravel. Each of the chain lengths 14 is individually mounted, and as many lengths may be mounted as are required by conditions, limited by the number of wheel-securing studs as will presently be obvious.

Referring to FIG. 5, a conventional automobile rear wheel mounting arrangement is shown including the rear axle assembly 16, brake cover 17, inner bearing and seal 18, outer bearing and seal 19, brake drum 20, brake shoe 21 and studs 22 extending from the brake drum 20. Wheel 24 bearing the tire 26 is mounted on the studs 22.

Conventional automobile wheels, due to imperforate wheel construction and the large diameter of modern brake drums, are not adaptable to the linking together of the ends of cross-tread tire chain lengths by passing the chain lengths through the wheel. It is thus necessary for such an arrangement to provide means on the wheel or brake drum for the attachment of the inner and outer ends of the chain lengths.

Figure 3:
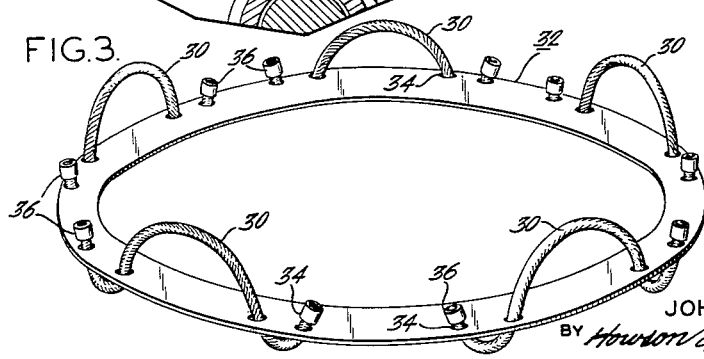
FIG. 3 is a perspective view showing the chain-securing ring and the attached wire rope loops.

In the present invention, the inner end of each cross-tread chain length 14 terminates in a hook 28 which engages one of the flexible wire rope loops 30 extending from the annular ring 32. As shown in FIG. 3, the wire loops 30 are passed through holes 34 in the ring and are secured therein by press fittings 36. The ring 32 is of such a size and diameter as to fit over the cylindrical brake drum surface 38 and seat against the outer face of the brake drum flange 40. The ring is positioned against the flange 40 prior to mounting the wheel 24 which when mounted in its normal position clamps the ring securely against the flange 40.

The ring 32 with its extending wire loops 30 may be left in position indefinitely, ready for use should conditions require the application of the chain lengths 14. The ring and wire loops do not in any way interfere with the normal operation of the automobile and are not visible. The ring may, of course, be removed simply by removing the wheel from the brake drum.

The outer ends of the cross-tread chain lengths 14 as shown in FIGS. 4 and 5 are attached to elongated nuts 42 on the studs 22 which are applied to the studs to secure the wheel 24 to the brake drum 20 in the normal manner. The elongated nuts 42 are drilled near the outer ends thereof to provide a hole 44 perpendicular to the axis of the nut through which passed the chain-securing bolt 46. The bolt 46 is passed through the link of the chain length 14 which provides the desired degree of tension to the chain. In the illustrated embodiment, the bolt is passed through the end line 47 of the chain although it can be understood that to fit various sized wheels and tires the chain length may be effectively shortened by passing the bolt through other links.

A washer 48 is employed adjacent the head of the bolt to provide a relatively flat bearing surface for the bolt head, and a nut 50 is tightened against the chain link through which the bolt passes to provide a firm seating of the chain link and bolt upon the elongated nut 42. Additionally, the nut 50 serves to prevent the bolt from slipping from the chain during application thereof and retains the bolt in the proper chain link during storage. A wing nut 52 is provided to secure the bolt 46 to the elongated nut 42, and the wing nut 52 may be adjusted to provide the desired tensioning of the chain length against the tire 26.

The elongated nuts 42 which replace the conventional wheel-securing stud nuts may be left on the wheel indefinitely and, as was the case with the annular ring 32, do not interfere with the normal operation of the automobile. The elongated nuts are hidden from view by the conventional hub cap or wheel cover when the chain lengths are not attached. The hub caps or wheel covers must of course be removed when the chain lengths are installed.

The illustrated embodiment of the invention comprises only three basic units, the ring 32 including the flexible wire loops 30, the chain lengths 14 having hooks 28 on the inner end thereof and bolts 46 on the outer end thereof, and the elongated nuts 42. Attachment of the device requires no alterations or permanent attachments to the automobile. The only tool needed for initially mounting the device is the wrench supplied with every car and carried as a piece of essential equipment for loosening and tightening the wheel nuts. No tools or jacks of any kind are required for attaching or removing the individual chain lengths.

For the initial installation of the device, the wheel is removed from the brake drum and the annular ring 32 is slipped over the cylindrical face 38 of the brake drum with the wire loops 30 extending inwardly. The wheel is then replaced to secure the ring against the brake drum flange 40. The elongated nuts 42 are used to tighten the wheel on the brake drum in place of the standard stud nuts. The presence of the ring 32 with the attached wire loops 30 between the wheel and the brake drum flange 40 does not prevent the wheel from seating against the brake drum in the normal fashion since the ring 32 and wire loops 30 are of such a size as to just fill the gap existing between the wheel and brake drum flange.

With the above steps accomplished the vehicle is equipped for the rapid mounting of the chain lengths when needed. As set forth above, the ring 32 and the elongated nuts may be left permanently in position without interfering with the vehicle operation in any way.

Figure 2:
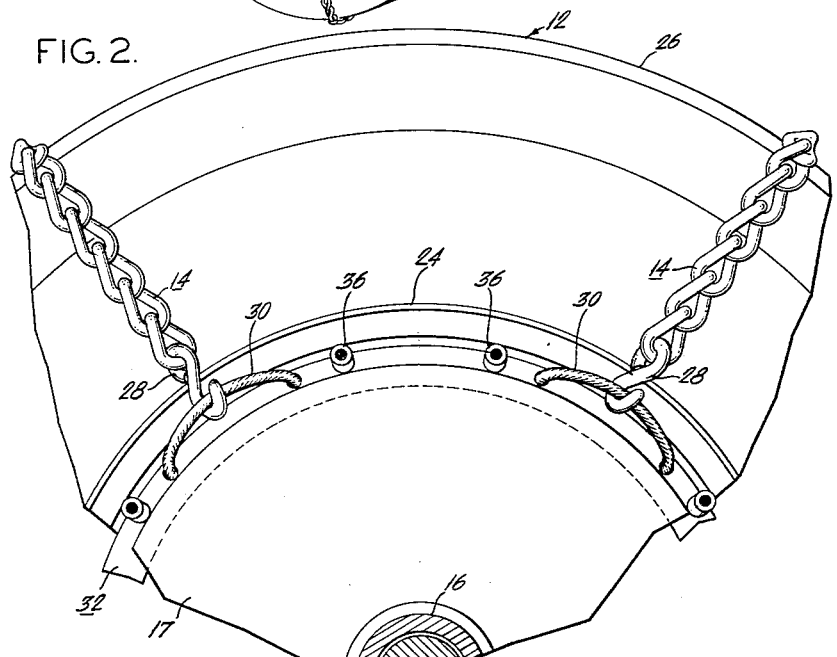
FIG. 2 is a partial elevational view of the back side of a mounted wheel assembly showing the manner in which the inner ends of the cross-tread chain lengths are secured.

When hazardous road conditions are encountered, each chain length 14 is attached by first engaging the hook 28 with one of the flexible wire loops 30 as shown in FIGS. 2 and 5. The bolt 46 on the outer end of the chain length is passed through the hole 44 in the elongated nut 42 on the stud 22 opposed from the selected wire loop 30. The wing nut 52 is then tightened to provide the desired tension of the chain length 14. The number of chain lengths which may be attached is of course limited by the number of studs securing the wheel to the brake drum. Passenger vehicles normally employ five studs for this purpose and there are thus five wire loops 30 attached to the annular ring 32 in the embodiments illustrated.

A modified form of annular ring 32a is shown in FIG. 6 which is similar to that of the preferred embodiment and includes spaced flexible wire loops 30a secured to the ring by means of holes 34a and press fittings 36a. The ring 32a, however, is split diametrically into two half rings 54 and 56 which are joined at one juncture by the plate 58 and bolts 60 and adjustably secured at the opposed juncture by means of the angles 62 secured to each half ring and the adjusting bolt 64 connecting the angles to permit adjustment of the ring diameter.

The modified ring embodiment is particularly adaptable to brake drums having ribbed outer surface constructions. By removal of the bolt 64, the split ring segments may be pivoted about the bolts 60, applied radially to the brake drum and then joined together by inserting and tightening the bolt to provide the desired fit of the ring. A further advantage of such a ring construction is that the rigid clamping of the ring to the brake drum prevents the dislodging of the ring during removal of the wheels such as in the event of a puncture.

A further modified chain-securing ring shown in FIGS. 7-9 provides means for retaining the ring upon a ribbed brake drum and means preventing rotation of the ring about the drum. The ring 32b is a one piece annular ring having wire loops 30b secured through holes 34b by press fittings 36b as in the previously described embodiments. The inside diameter of the ring is sufficient to clear the rib 66 of the brake drum 20b.

The ring is secured between the rib 66 and the brake drum flange 40b by means of ring retaining plates 68 which are secured at spaced intervals to the ring by bolts 70. As shown in FIG. 11, the retaining plates have curved inner and outer edges 72 and 74, the outer edge curve corresponding with the outer edge of the ring. The inner edge 72 of each plate extends radially inwardly from the ring to engage the rib 66 as shown in FIG. 9 and thus prevent movement of the ring across the brake drum surface 38b. Should the wheel be removed from the brake drum, with this ring retaining plate arrangement the chain-securing ring will be retained in its proper position adjacent the brake drum flange. The plates must, of course, be attached to the ring after it has been positioned on the drum and must be removed before the ring can be removed from the drum.

To prevent rotation of the ring with respect to the brake drum, a locking assembly 76 is mounted on the inner side of the ring 32b and comprises opposed locking elements 78 and 80 which are pivotally mounted adjacent the ring by rivets 82. The locking elements as shown in FIG. 10 each includes a flange portion 84 which is drilled to receive the locking bolt 86. Tightening of the locking bolt 86 rotates the locking elements about the rivets 82 thereby engaging the pointed lower tips 88 of the locking elements with the brake drum surface, locking the ring against rotational movement with respect to the brake drum. The locking assembly does not interfere with the mounting of the wheel since it extends only from the inner side of the ring, with the flange portions 84 extending over the brake drum flange 40b.

The simplicity of attachment of the chain lengths 14 permits installation in a few minutes time even under adverse conditions. There is no necessity for jacking the car off the ground as is generally the case with conventional chains. The short lengths of chain are easily handled and may be stored in a relatively small storage area. Individual chain lengths may be replaced as wear becomes evident at relatively little cost.

A particularly advantageous feature of the invention resides in the tensioning of the chain lengths by means of the bolts 46 and wing nuts 52 to provide and maintain a constant tension of the chain lengths. In contrast, conventional elastic or spring-loaded tensioning arrangements permit a radial expansion of cross-tread chain lengths under the stress of centrifugal forces thus causing an undesirable loose condition of the chain lengths with respect to the tire tread. The present arrangement insures a tight engagement of the chain lengths to the tire tread and prevents the destructive slapping of he chains against the road and the tire thus increasing the life of the chains and the tire as well as providing a quieter operation.

Changes in details of construction can be effected by those skilled in the art without departing from the spirit and the scope of the invention as defined in and limited solely by the appended claims.

I claim:
1. For a vehicle having a brake drum and a wheel adapted to be secured thereto by lug nuts threaded on studs carried by the brake drum and projecting outwardly through openings in the wheel, a chain mounting arrangement for securing the inner and outer ends of individual cross-tread chain lengths extending transversely about a tire on the wheel, comprising a ring adapted for positioning in circumscribing relation about the vehicle brake drum between the wheel and a radially extending brake drum flange, means on said ring defining a plurality of projecting loops at the side of said ring remote from the wheel, a hook on the inner end of each chain length adapted for detachable engagement with one of said loops, elongated lug nuts on the brake drum studs securing the wheel to the brake drum each having a transverse hole in the outer end thereof, a bolt attached to the outer end of each of said chain lengths adapted to pass through the hole in one of said elongated lug nuts, and a nut on each said bolt for securing each said chain length to said elongated lug nuts, said nut and bolt on each said chain length in conjunction with said lug nuts comprising tensioning means permitting tightening of each said chain length about the vehicle tire.

2. An anti-skid tire chain arrangement for a vehicle having a brake drum and a wheel adapted to be secured thereto by lug nuts threaded on studs carried by the brake drum and projecting outwardly through openings in the wheel, said arrangement comprising a ring adapted for positioning in circumscribing relation about the brake drum between the wheel and a radially extending brake drum flange, means on said ring defining a plurality of projecting loops at the side of said ring remote from the wheel, at least one cross-tread chain length adapted to extend transversely about a tire mounted on a wheel, a hook on the inner end of said chain length adapted for detachable engagement with one of said loops, elongated lug nuts on the brake drum studs securing the wheel to the brake drum each having a transverse hole in the outer end thereof, a bolt attached to the outer end of said chain length adapted to pass through the hole in one of said elongated lug nuts, and a nut on said bolt for securing said chain length to one of said elongated lug nuts, said nut and bolt on said chain length in conjunction with one of said lug nuts comprising tensioning means permitting tightening of said chain length about the vehicle tire.

3. An anti-skid tire chain arrangement as claimed in claim 2, wherein the wheel in the normal mounted position engages and clamps said ring against the brake drum flange.

4. An anti-skid tire chain arrangement as claimed in claim 2, wherein said means on said ring defining a plurality of projecting loops comprises a plurality of wire rope loops secured to an extending from said ring.

5. An anti-skid tire chain arrangement as claimed in claim 2, wherein said bolt is adapted to pass through the links of the cross-tread chain such that the chain length may be selectively adjusted by insertion of said bolt through the desired chain link.

6. An anti-skid tire chain arrangement as claimed in claim 2, wherein said ring comprises two half-rings, and means connecting said half-rings permitting adjustment of the ring diameter whereby the ring may be radially adjusted to engage the brake drum.

7. An anti-skid tire chain arrangement as claimed in claim 2, including means on said ring for preventing rotation of said ring with respect to the brake drum.

8. An anti-skid tire chain arrangement as claimed in claim 7, wherein said means on said ring for preventing rotation of said ring with respect to the brake drum comprises opposed locking elements pivotally secured to said ring, and means for adjustably pivoting said locking elements to engage said elements with the brake drum.

9. An anti-skid tire chain arrangement as claimed in claim 2, including means for retaining said ring in position on said brake drum upon removal of the wheel, said means comprising a plurality of ring retaining plates secured at spaced intervals to the ring, said plates extending radially inwardly from the ring to engage a radially extending rib on the brake drum, said plates retaining said ring between the rib and the brake drum flange and preventing axial movement thereof with respect to the brake drum.

10. An anti-skid tire chain mounting arrangement for a vehicle having a brake drum and a wheel adapted to be secured thereto by lug nuts threaded on studs carried by the brake drum and projecting outwardly through openings in the wheel, said mounting arrangement comprising means for releasably securing and tensioning the outer end of a cross-tread chain length, said means comprising an elongated lug nut on one of the brake drum studs securing the wheel to the brake drum, said elongated nut having a transverse hole in the outer end thereof, a bolt attached to the outer end of said chain length adapted to pass through the hole in said elongated lug nut, and a nut on said bolt for securing said chain length to said elongated lug nut, said nut and bolt on said chain length in conjunction with said lug nut comprising tensioning means permitting tightening of said chain length about the vehicle tire.

References Cited by the Examiner
UNITED STATES PATENTS

| | | | |
|---|---|---|---|
| 2,204,783 | 6/40 | Wettlaufer | 152—231 |
| 2,283,179 | 5/42 | Buckingham | 85—32 |
| 2,733,748 | 2/56 | Cranston | 152—231 |

ARTHUR L. LA POINT, *Primary Examiner.*